Patented Sept. 20, 1932

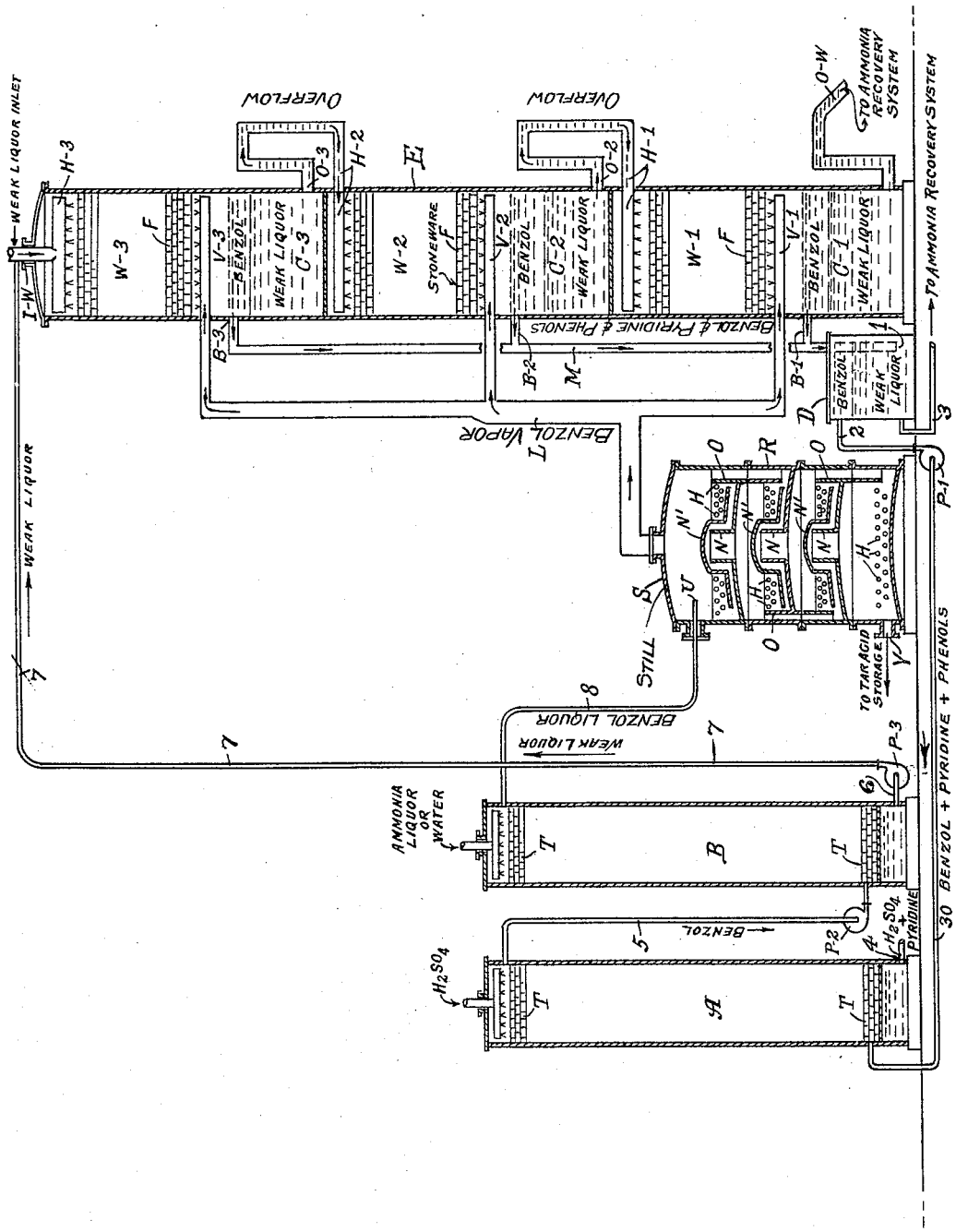

1,878,927

UNITED STATES PATENT OFFICE

WALTER R. KNAPP, OF PELHAM MANOR, NEW YORK, ASSIGNOR TO SEMET-SOLVAY COMPANY, OF NEW YORK, N. Y., A CORPORATION OF NEW YORK

PROCESS FOR THE REMOVAL AND RECOVERY OF PHENOLS AND PYRIDINE FROM LIQUORS

Application filed December 10, 1926. Serial No. 154,012.

This invention relates to the separation of organic compounds from waste liquors, and more particularly to a process for the removal and recovery of phenols and pyridine from the weak liquor of coal carbonization plants and apparatus therefor.

Under the present system of disposing of industrial wastes, it is customary to discharge waste liquors resulting from industrial operations into water courses or the like. This practice has caused the contamination of waters with deleterious chemicals of one sort or another. In the operation of coal carbonization plants the waste liquor is generally discharged from the ammonia stills directly into water courses or indirectly through sewage systems. The waste liquor contains among other things various phenols and also pyridine which are deleterious. These chemicals contaminate the streams of water into which they are discharged and render such water unfit for human consumption and even for some industrial or household purposes.

Various proposals have been suggested in an endeavor to eliminate and to prevent the pollution and contamination of rivers, lakes, and other bodies of water with phenols and pyridine. None of these proposals, however, have been entirely satisfactory because of various shortcomings.

It is the prime object of the present invention to provide a method for removing phenols or tar acids and pyridine from waste liquors efficiently, economically, and satisfactorily.

Another object is to provide a method which will be continuous in operation and which will recover phenols and pyridine as separate products.

A further object of the invention is to provide an apparatus in which my improved method may be accomplished.

The invention will be best understood by reference to the accompanying drawing forming a part of this specification, and illustrating a sectional view, somewhat diagrammatic, of a preferred embodiment of my apparatus.

The weak liquor produced in coal carbonization plants, containing among other things, phenols and pyridine is in my system pumped into an extraction tower E which is composed of a plurality of superimposed washers W. In the present instance three washers are used in the extraction tower but any other number may be used according to the particular circumstances. The washers are operatively connected with each other so as to permit the weak liquor to flow successively through each washer in successive stages of purification and finally, freed from phenols and pyridine, out of the extraction tower. The weak liquor pumped to the top of the tower passes through inlet I—W and issues from spray head H—3 in the uppermost washer W—3 as a spray or the like. The spray trickles through packing material F in this washer and comes into intimate contact with hot benzol vapors issuing from a distributor head V—3 positioned at an intermediate point in the washer W—3 beneath the packing F. The benzol vapors pass upwardly into contact with the descending weak liquor and are thereby condensed to liquid benzol which mixes with the descending liquor and is carried downward therewith into the separating chamber C—3. The benzol vapors which pass directly from the still to the distributor head V—3 are hot and therefore effect very efficient absorption and extraction of phenols and pyridine from the weak liquor. The condensed benzol and weak liquor which pass into the chamber C—3 separate with great avidity. The liquid falling from the base of the packing material flows into a separating chamber C—3 wherein the liquid stratifies into two layers. The upper layer contains the benzol with the absorbed phenols and pyridine whereas the lower layer contains the weak liquor. The benzol in the upper layer flows out through line B—3, while the liquor of the lower layer flows through an overflow O—3 to a spray head H—2 in the middle washer W—2. The construction and operation of this washer W—2 are the same as that of the washer W—3 and, therefore, the description need not be repeated. The benzol layer flows out of the separating chamber C—2 through an outlet B—2 which is connected to a main pipe line M running to a decanter D. The aqueous layer in C—2 leaves the chamber through overflow line O—2 which is connected to a spray head H—1 in the lowermost washer W—1. This washer is of the same construction as W—2 and W—3, and the weak liquor from W—2 is subjected to treatment with benzol vapor issuing from a distributor head V—1 in the washer W—1. This last extraction treatment removes substantially the last part of the phenols and pyridine contained in the weak liquor so that the aqueous liquor in the separating chamber C—1 may be discharged directly into water ways or sewage systems without fear of contaminating any public waters. Before thus discharging the so purified liquor it is preferred as indicated in the drawing to withdraw the liquor through outlet O—W for treatment for the recovery of its ammonia content before the liquor is finally drained off.

The benzol with accompanying phenols and pyridine is withdrawn from the several separating chambers through lines B—1, B—2, and B—3 respectively to a main line M which is connected to a decanter D, as noted heretofore. The line M extends into the interior of the decanter and terminates in an open end 1 at the lower portion thereof. In case any weak liquor was carried over with the benzol, it is trapped in the decanter. This liquor flows out through discharge pipe 3 which leads to a waste line or to ammonia stills (not shown). Practically clean benzol containing phenols and pyridine flows through the outlet 2 near the top of the decanter. The benzol is pumped from outlet 2 through pipe 30 by means of any suitable pump P—1 to an acid scrubbing tower A wherein the benzol is thoroughly washed with dilute sulfuric acid. The benzol enters the tower A near the base thereof and flows upwardly through the packing T and in counter current to the sulfuric acid which enters the top of the tower and flows downwardly. In this manner the benzol is washed thoroughly with sulfuric acid and is practically freed of the pyridine contained therein. The sulfuric acid containing the pyridine is discharged from the tower through a discharge line 4 which leads to any appropriate pyridine recovery apparatus. The washed benzol, on the other hand, is discharged from the top of the tower through pipe line 5 which communicates with tower B via pump P—2. In tower B the benzol flows upwardly through packing T wherein it is washed with water or ammoniacal liquor descending from the top of the tower. The aqueous liquor flows downwardly and leaves the bottom of the tower through discharge outlet 6. A pump P—3 is connected to this outlet and pumps the weak liquor through the line 7 to the inlet I—W at the top of the extraction tower. By returning the weak liquor to the extraction tower any phenols which are washed from the benzol in tower B are recovered. When ammoniacal liquor is used in place of water the sulfuric acid is practically completely neutralized and a substantially neutral liquor is returned to the extraction tower. As a result of the scrubbing operation the benzol leaves the top of tower B practically free from acid and is in condition to be sent to the top of still S through pipe 8. This still is made of any desired number of ring sections R although only three sections are shown in the apparatus illustrated. Each section is provided with a steam coil H which is positioned over a cap N' and plate N. The benzol liquor enters the still at U and passes from plate to plate via the overflow collars O. During the passage of the liquid through the still the benzol is distilled off and is returned to the washing tower E via conduit L, whereas the remaining liquor containing the heavier tars and phenols works down through the distillation column S to the bottom thereof and flows out through outlet Y to a storage tank (not shown) for tar acids. According to the foregoing procedure there is a continuous return of benzol vapors free from phenols and pyridine, a continuous recovery of phenols free from benzol or pyridine, while pyridine is separated continuously from the benzol extraction solvent so that practically no benzol is lost as an emulsion. It is important for satisfactory and successful commercial operation that substantially all the pyridine be removed from the circulating solvent in order to prevent said solvent from being excessively affected by the active emulsifying activity of pyridine. Then again if the pyridine is not removed from the benzol prior to distillation it will distill off with the benzol vapor in the distillation column due to the fact that the boiling point of pyridine in the presence of some water, which is carried over into the still, approximates that of the benzol. Upon condensation of the said vapors in the extraction tower, emulsification and loss of some benzol will be caused by the circulating pyridine. The aforesaid disadvantages and losses of benzol are all avoided by my invention.

It will be observed that by the use of my improved process a continuous and cyclic operation is maintained whereby pyridine and tar acids are recovered separately, and whereby benzol is reused with practically no loss.

According to one procedure suggested by the prior art a batch of the waste liquor is treated with benzol followed by separation of the purified liquor from the benzol which now contains the extracted phenols and pyridine, and that benzol is then mixed with caustic soda solution to effect a reaction with the phenols. The caustic liquor is then drawn off and treated with sulfuric acid for recovery of phenols while the benzol and pyridine are reemployed to treat the next batch of waste liquor. It will be seen that my improved process eliminates any such batch process as well as the use of caustic followed by sulfuric acid and also eliminates the cumbersomeness of the prior procedure and avoids the emulsifying activity of the pyridine which in the old process remains in the benzol.

It will also be noted that my improved system requires no extra labor and operates practically automatically.

I claim:

1. A continuous cyclic process for effecting the removal of phenols and pyridine from aqueous liquor containing the same, which comprises contacting the liquor with a vaporous absorbing medium having in the liquid phase a boiling point substantially different from that of the phenols so as to permit the separation of the absorbing medium from the phenols by distillation, whereby the vaporous absorbing medium is condensed and phenols and pyridine extracted from the liquor, separating the resultant solution of absorbing medium, phenols and pyridine from the extracted liquor, treating the absorbing medium containing the phenols and pyridine to remove pyridine therefrom, thereafter distilling the resultant pyridine-free solution to distill off the absorbing medium in vaporous form and thus separate the absorbing medium from the phenols, and utilizing the vaporous absorbing medium to extract phenols from additional aqueous liquor.

2. A continuous cyclic process for extracting phenols and pyridine from aqueous waste liquors containing the same which comprises the combination of process steps of continuously passing liquor to be treated downwardly into successive contacts with benzol, continuously introducing benzol in the form of hot vapors which pass upwardly into contact with said aqueous waste liquors whereby the benzol vapors are condensed to a liquid state and extract phenols and pyridine from said liquor, separating the resulting benzol solution of pyridine and phenols from the treated liquor, passing said benzol solution countercurrent to sulfuric acid to remove pyridine from said solution, washing said solution, adding the wash liquor to the waste aqueous liquor for treatment with benzol, distilling the resulting pyridine-free benzol solution of phenols to distill off the phenols and regenerate hot benzol vapors, and continuously returning the so produced benzol vapors to the system to treat further quantities of aqueous waste liquors.

In testimony whereof I have hereunto set my hand.

WALTER R. KNAPP.